United States Patent
Kang et al.

(10) Patent No.: US 7,587,212 B2
(45) Date of Patent: Sep. 8, 2009

(54) SYSTEM AND METHOD FOR ALLOCATING RANGING SLOTS IN A BROADBAND WIRELESS ACCESS COMMUNICATION SYSTEM

(75) Inventors: Hyun-Jeong Kang, Seoul (KR); Chang-Hoi Koo, Seongnam-si (KR); Jung-Je Son, Seongnam-si (KR); Bongseog Jang, Jeollanam-do (KR)

(73) Assignee: Samsung Electronics Co., Ltd (KR)

( * ) Notice: Subject to any disclaimer, the term of this patent is extended or adjusted under 35 U.S.C. 154(b) by 669 days.

(21) Appl. No.: 11/328,383

(22) Filed: Jan. 9, 2006

(65) Prior Publication Data
US 2006/0153131 A1    Jul. 13, 2006

(30) Foreign Application Priority Data
Jan. 8, 2005  (KR) ............... 10-2005-0001968

(51) Int. Cl.
*H04Q 7/00*  (2006.01)
(52) U.S. Cl. .............. 455/510; 455/509; 455/512; 455/513; 455/500; 455/403; 370/208; 370/210; 370/329; 370/462; 370/330
(58) Field of Classification Search ............ None
See application file for complete search history.

(56) References Cited

U.S. PATENT DOCUMENTS

2005/0286465 A1*  12/2005  Zhuang ............... 370/329
2005/0286547 A1*  12/2005  Baum et al. .......... 370/437
2007/0032255 A1*  2/2007  Koo et al. ........... 455/512
2007/0058524 A1*  3/2007  Modlin et al. ........ 370/208
2007/0060180 A1*  3/2007  Muharemovic et al. ... 455/509
2008/0304448 A1*  12/2008  Hosein ............... 370/329

OTHER PUBLICATIONS

Chulsik Yoon, "Define and Use of HO Ranging Code", Jun. 25, 2004, IEEE 802.16e-04/187.*
Changhoi Koo et al., "Individual Backoff Time Allocation for Each Ranging Code Set", May 15, 2005, IEEE 802.16 Rev(8.21).*

* cited by examiner

*Primary Examiner*—Charles N Appiah
*Assistant Examiner*—Randy Peaches
(74) *Attorney, Agent, or Firm*—The Farrell Law Firm, LLP

(57) ABSTRACT

A method for determining a number of ranging slots by a base station (BS) in a broadband wireless access (BWA) communication system. The method includes counting the number of mobile stations (MSs) that succeeded in ranging in a current frame, determining a ranging slot occupation ratio in the current frame, comparing a ranging slot occupation ratio of a previous frame with the ranging slot occupation ratio of the current frame, detecting an increase in the number of ranging-requesting MSs, if the ranging slot occupation ratio of the current frame is greater than the ranging slot occupation ratio of the previous frame, and determining the number of ranging slots of a next frame such that the number of ranging slots of the next frame is greater than the number of ranging slots of the current frame.

25 Claims, 7 Drawing Sheets

SYSTEM AND METHOD FOR ALLOCATING RANGING SLOTS IN A BROADBAND WIRELESS ACCESS COMMUNICATION SYSTEM

PRIORITY

This application claims the benefit under 35 U.S.C. § 119(a) of an application filed in the Korean Intellectual Property Office on Jan. 8, 2005 and assigned Serial No. 2005-1968, the entire contents of which are incorporated herein by reference.

BACKGROUND OF THE INVENTION

1. Field of the Invention

The present invention relates generally to a Broadband Wireless Access (BWA) communication system, and in particular, to a system and method for allocating ranging slots in a BWA communication system using an Orthogonal Frequency Division Multiplexing/Orthogonal Frequency Division Multiple Access (OFDM/OFDMA) scheme.

2. Description of the Related Art

Research is being actively conducted on the $4^{th}$ generation (4G) next generation communication system, to provide users with services guaranteeing various qualities-of-service (QoS) at a data rate of about 100 Mbps. Currently, the $3^{rd}$ generation (3G) communication system generally supports a data rate of about 384 Kbps in an outdoor channel environment having poor channel conditions, and supports the data rate of a maximum of only about 2 Mbps even in an indoor channel environment having good channel conditions.

An Institute of Electrical and Electronics Engineers (IEEE) 802.16 communication system, one of the typical BWA communication systems, performs a ranging operation between a mobile station (MS) and a base station (BS) to make communication.

With reference to FIG. 1, a description will now be made of a system configuration considered in the IEEE 802.16 communication system known in the prior art.

FIG. 1 is a diagram schematically illustrating a configuration of a conventional IEEE 802.16 communication system.

Referring to FIG. 1, the IEEE 802.16 communication system has a multicell configuration including a cell 100 and a cell 150. The system includes a BS 110 for managing the cell 100, a BS 140 for managing the cell 150 and a plurality of MSs 111, 113, 130, 151 and 153. Signal exchanges between the BSs 110 and 140 and the MSs 111, 113, 130, 151 and 153 are achieved using an OFDM/OFDMA scheme.

A communication system using an OFDM scheme (hereinafter "OFDM communication system") is similar in frame format to a communication system using an OFDMA scheme (hereinafter "OFDMA communication system"), but the OFDM communication system differs from the OFDMA communication system in that the full subcarrier interval in a particular symbol is used by one MS. One OFDMA frame is comprised of a plurality of OFDMA symbols, and each of the OFDMA symbols is comprised of a plurality of subchannels. Every OFDMA frame has a ranging channel, and each ranging channel is comprised of a plurality of ranging slots and one or more subchannels, and unique numbers of the subchannels constituting the ranging channel are included in an uplink MAP (UL-MAP) message.

The UL-MAP message, which represents uplink frame information, includes an Uplink Channel identifier (ID) field indicating an uplink channel ID used, an Uplink Channel Descript (UCD) count field indicating a count corresponding to a change in format of a UCD message including an uplink burst profile, and a Number of UL-MAP Element n field indicating the number of elements existing after the UCD count.

As a result, the OFDMA communication system requires a ranging process of determining a correct time offset between a BS and an MS and adjusting a power level. Rangings used in the IEEE 802.16 communication system are classified into initial ranging, maintenance ranging (or periodic ranging) and bandwidth request ranging.

1) Initial Ranging

The initial ranging, which is for synchronization acquisition for a BS and an MS, is performed to determine a correct time offset between the BS and the MS and adjust transmission power. That is, upon power-on, the MS performs the initial ranging in order to acquire synchronization with the BS by receiving such information broadcasted from the BS as a DL-MAP message, a UL-MAP message and a UCD message, and then to adjust the time offset and the transmission power with the BS.

2) Periodic Ranging

The periodic ranging refers to the ranging that is periodically performed by the MS to adjust channel conditions with the BS, after adjusting the time offset and transmission power with the BS through the initial ranging.

3) Bandwidth Request Ranging

The bandwidth request ranging refers to the ranging in which the MS requests bandwidth allocation to perform actual communication with the BS, after adjusting the time offset and transmission power with the BS through the periodic ranging.

With reference to FIG. 2, a description will now be made of a format of an uplink frame in a communication system using the OFDM and/or OFDMA scheme (hereinafter "OFDM/OFDMA communication system").

FIG. 2 is a diagram schematically illustrating a format of an uplink frame in an OFDM/OFDMA BWA communication system, and in particular, a format of an uplink frame in an IEEE 802.16a/IEEE 802.16e OFDM communication system.

Referring to FIG. 2, an uplink frame 200 includes an initial ranging contention slot region 210 allocated for the initial ranging, a bandwidth request contention slot region 220 allocated for the bandwidth request ranging, and a plurality of uplink burst regions 230 and 240 including uplink data of MSs.

The initial ranging contention slot region 210 has a plurality of access burst intervals including actual initial ranging information, and a collision interval prepared for possible collision between the access burst intervals.

The bandwidth request contention slot region 220 has a plurality of bandwidth request intervals including actual bandwidth request ranging information, and a collision interval prepared for possible collision between the bandwidth request intervals.

The uplink burst regions 230 and 240 each include a plurality of burst regions so that uplink data can be transmitted for each of individual MSs, and each of the burst regions includes a preamble 231 and an uplink burst 233.

Each MS that desires to perform initial ranging randomly selects one slot from the initial ranging contention slot 210, and transmits an access request including information on the selected slot to a BS. However, if two or more MSs select the same initial ranging slot, collision occurs. In this case, the MSs retry the initial ranging after a delay of a predetermined back-off time in order to increase a ranging success rate at the next attempt. This back-off process is applied in the same way to the periodic ranging and the bandwidth request ranging as well as the initial ranging.

FIG. 3 is a signaling diagram schematically illustrating a communication process in a BWA communication system.

Referring to FIG. 3, upon power-on, an MS 320 monitors all frequency bands previously established thereto, and detects a pilot channel signal having the highest pilot carrier-to-interference and noise ratio (CINR). The MS 320 determines a BS 300 that transmitted the pilot channel signal having the highest pilot CINR, as its own BS where it is currently located, and acquires system synchronization with the BS 300 by receiving a preamble in a downlink frame transmitted by the BS 300.

If the system synchronization is acquired between the MS 320 and the BS 300, the BS 300 transmits a DL-MAP message and a UL-MAP message to the MS 320 in steps 301 and 303, respectively. The DL-MAP message is used to provide the MS 320 with information necessary for acquiring synchronization with the BS 300 by the MS 320 in a downlink and information on a format of a physical channel capable of receiving messages transmitted to MSs in the downlink using the information. The UL-MAP message is used to provide the MS 320 with such information as MS's scheduling period and a format of the physical channel in the downlink.

In the ranging process, the MS 320 transmits a Ranging Request (RNG-EQ) message to the BS 300 in step 305, and upon receiving the RNG-REQ message, the BS 300 transmits a Ranging Response (RNG-RSP) message including information for correcting frequency, time and transmission power, to the MS 320 in step 307.

FIG. 4 is a diagram schematically illustrating a back-off process at the collision of ranging slots in a conventional BWA communication system.

Although the back-off process described with reference to FIG. 4 can be applied to the initial, periodic and bandwidth request ranging processes, it will be assumed herein that the back-off process is applied to the initial ranging process, by way of example.

Referring to FIG. 4, one frame includes L ranging slots for initial ranging. In the case of a first frame, a third ranging slot among the L ranging slots was selected by 3 MSs to transmit RNG-REQ messages. The MSs transmitting the RNG-REQ messages at the third ranging slot will be assumed to be a first MS 401, a second MS 403 and a third MS 405.

Preferably, one ranging slot is occupied by one MS. However, when one ranging slot is selected by a plurality of MSs on a contention basis as shown in FIG. 4, the MSs cannot request the ranging at the corresponding ranging slot.

Therefore, only one of the first MS 401, the second MS 403 and the third MS 405 can perform initial ranging request at the third ranging slot, and the remaining MSs perform the random back-off process. For example, when the first MS 401 occupies the third ranging slot, the second MS 403 performs ranging request at a fourth ranging slot in a second frame by performing a random back-off process, and the third MS 405 performs ranging request at a second ranging slot in the second frame by performing a random back-off process.

Conventionally, a BS allocates ranging fields to MSs according to a fixed ranging slot field and a fixed ranging allocation period. That is, the BS must minimize the collision caused by slot sharing between MSs and an access delay caused by the back-off by maintaining a maximum number of slots as ranging attempt slots, since it cannot know how many MSs have previously performed ranging request. In other words, in the conventional ranging field allocation process, the BS previously determines a fixed number of ranging slots and a fixed ranging slot allocation period during system building or network design. However, excessive ranging attempts caused by an increase in number of MSs may lead to overload on the system, causing a ranging delay. In this case, the system operator should undesirably modify the fixed ranging slot field by redesigning the system. In addition, when the number of MSs decreases, the ranging slot field fixed during the initial system design causes a waste of radio resources.

SUMMARY OF THE INVENTION

It is, therefore, an object of the present invention to provide a system and method for dynamically adjusting the number of ranging slots in a BWA communication system.

It is another object of the present invention to provide a system and method for dynamically adjusting a ranging allocation period in a BWA communication system.

It is further another object of the present invention to provide a system and method for increasing a ranging success rate of an MS that performs ranging in a BWA communication system.

It is yet another object of the present invention to provide a system and method for efficiently using radio resources in a BWA communication system.

According to one aspect of the present invention, there is provided a method for determining a number of ranging slots by a base station (BS) in a broadband wireless access (BWA) communication system. The method includes counting a number of mobile stations (MSs) that succeeded in ranging in a current frame, determining a ranging slot occupation ratio in the current frame, comparing a ranging slot occupation ratio of a previous frame with the ranging slot occupation ratio of the current frame, detecting an increase in a number of ranging-requesting MSs, if the ranging slot occupation ratio of the current frame is greater than the ranging slot occupation ratio of the previous frame, and determining a number of ranging slots of a next frame such that the number of ranging slots of the next frame is greater than the number of ranging slots of the current frame.

According to another aspect of the present invention, there is provided a method for determining a ranging slot allocation period by a base station (BS) in a broadband wireless access (BWA) communication system. The method includes counting a number of mobile stations (MSs) that succeeded in ranging in a current frame, determining a ranging slot occupation ratio of the current frame, determining an average slot occupation ratio up to the current frame depending on an average slot occupation ratio up to a previous frame and the slot occupation ratio of the current frame, comparing the average slot occupation ratio up to the current frame with a threshold, and decreasing a ranging slot allocation period if the average slot occupation ratio up to the current frame is greater than the threshold.

According to a further aspect of the present invention, there is provided a system for performing ranging according to a number of ranging slots in a broadband wireless access (BWA) communication system including a base station (BS) and a mobile station (MS). The BS counts a number of MSs that succeeded in ranging in a current frame, determines a ranging slot occupation ratio in the current frame, compares a ranging slot occupation ratio of a previous frame with the ranging slot occupation ratio of the current frame, detects an increase in a number of ranging-requesting MSs if the ranging slot occupation ratio of the current frame is greater than the ranging slot occupation ratio of the previous frame, and determines a number of ranging slots of a next frame such that the number of ranging slots of the next frame is greater than the number of ranging slots of the current frame. The MS receives an uplink MAP (UL-MAP) of the current frame being broadcasted from the BS, analyzes ranging information including the number of ranging slots of the next frame, and performs ranging depending on the analyzed ranging information.

According to yet another aspect of the present invention, there is provided a system for performing ranging according to a ranging slot allocation period in a broadband wireless access (BWA) communication system including a base station (BS) and a mobile station (MS). The BS counts a number of MSs that succeeded in ranging in a current frame, determines a ranging slot occupation ratio in the current frame, determines an average slot occupation ratio up to the current frame depending on an average slot occupation ratio up to a previous frame and the slot occupation ratio of the current frame, compares the average slot occupation ratio up to the current frame with a threshold, and decreases a ranging slot allocation period if the average slot occupation ratio up to the current frame is greater than the threshold. The MS receives an uplink MAP (UL-MAP) of the current frame being broadcasted from the BS, analyzes ranging information including the determined ranging slot allocation period, and performs ranging depending on the analyzed ranging information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

The present invention proposes a system and method for increasing ranging success rate and resource allocation efficiency by dynamically controlling the number of ranging slots or a ranging allocation period in a communication system using an OFDMA communication system. For convenience, an embodiment of the present invention will be described with reference to OFDMA communication system, as an example of the foregoing communication system. The present invention about dynamically controlling the number of ranging slots or a ranging allocation period can also be applied to other communication systems as well as the OFDMA communication system.

More specifically, the present invention can dynamically determine the optimal number of ranging slots or the optimal ranging allocation period for each individual frame taking into account both an access delay and the ranging slot efficiency in a ranging process between a base station (BS) and a mobile station (MS).

Conventionally, ranging regions are fixedly determined during the initial system design. In this case, an increase in number of ranging slots reduces an access delay and collision, but deteriorates slot efficiency. On the contrary, a decrease in number of ranging slots increases the slot efficiency, but causes an access delay and collision. Therefore, the present invention can increase radio resource efficiency by dynamically determining the number of ranging slots or a ranging allocation period according to the number of ranging-attempting MSs, which varies every OFDMA frame. The dynamic ranging slot regions are broadcasted by the BS through a UL-MAP message.

The present invention can be applied to initial ranging, periodic ranging process and bandwidth request ranging. Herein, the present invention will be described with reference to the initial ranging, by way of example.

Figure 5:
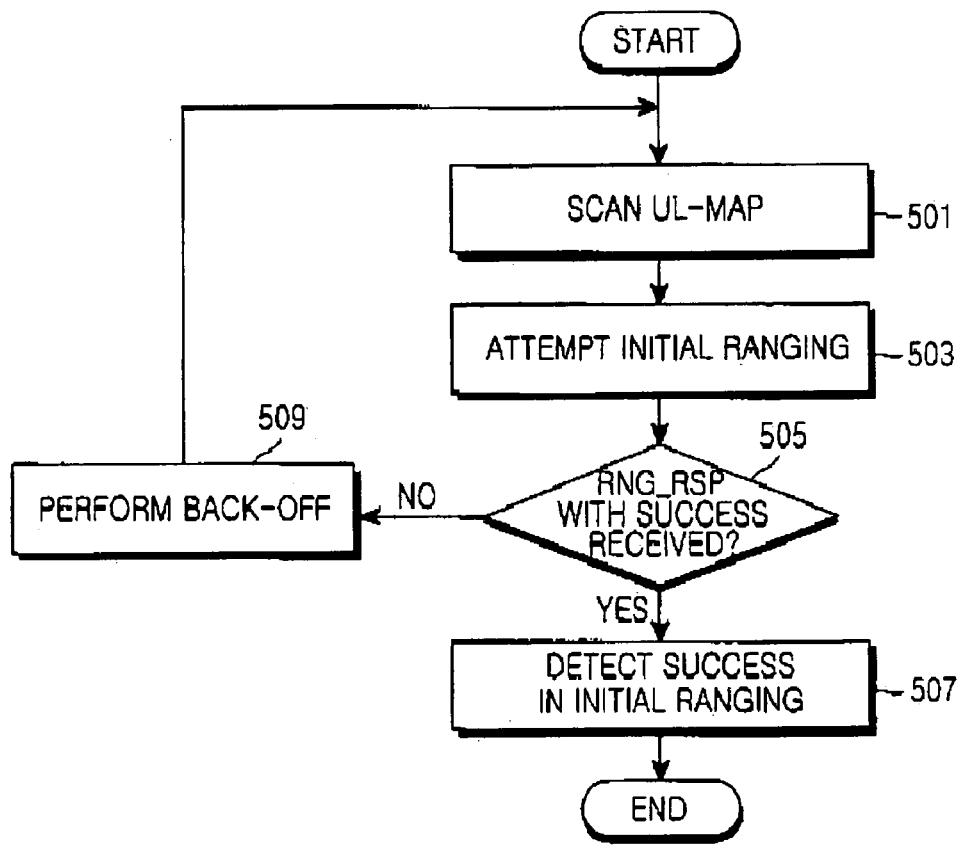
FIG. 5 is a flowchart illustrating an initial ranging process performed by an MS according to a first embodiment of the present invention.

FIG. 5 is a flowchart illustrating an initial ranging process performed by an MS according to a first embodiment of the present invention.

Referring to FIG. 5, an MS scans a UL-MAP broadcasted from a BS and detects a dynamically determined initial ranging contention slot field in step 501. The MS randomly selects one slot from the initial ranging contention slot field and transmits a Ranging Request (RNG-REQ) message to the BS in step 505. The MS determines in step 505 whether a Ranging Response (RNG-RSP) message is received in response to the RNG-REQ message. If the MS receives the 'RNG-RSP with success' message from the BS within a predetermined RNG-RSP message waiting time, the MS proceeds to step 507. Otherwise, the MS proceeds to step 509. In step 507, the MS detects a success in initial ranging to the BS. In step 509, the MS performs a random back-off process, detecting a failure in the initial ranging, and then returns to step 501.

Figure 6:
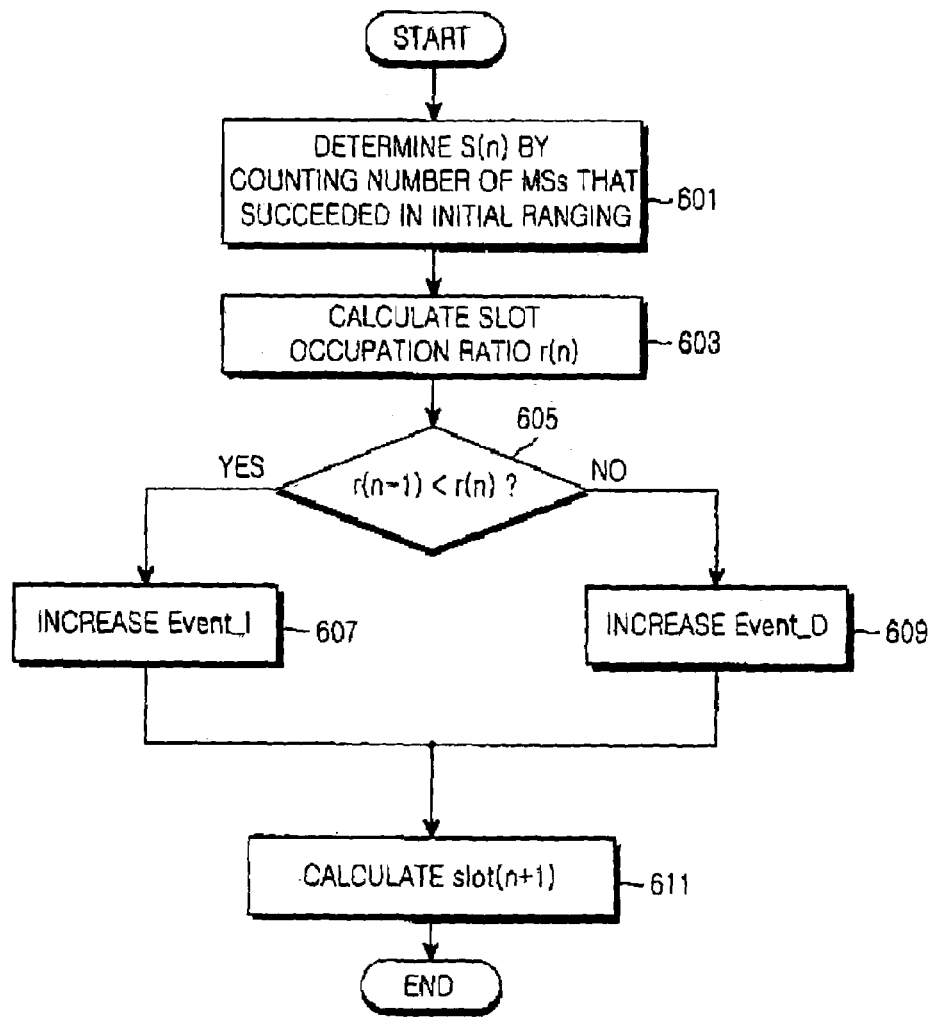
FIG. 6 is a flowchart illustrating a process of dynamically determining the number of initial ranging contention slots by a BS according to a first embodiment of the present invention.

FIG. 6 is a flowchart illustrating a process of dynamically determining the number of initial ranging contention slots by a BS according to the present invention.

Before a description of FIG. 6 is given, it should be noted that the BS calculates the number of initial ranging contention slots of an $(n+1)^{th}$ frame (next frame) in an $n^{th}$ frame (current frame), and the calculated number of the initial ranging contention slots of the $(n+1)^{th}$ frame is reflected in a UL-MAP broadcasted in the $(n+1)^{th}$ frame. Therefore, the MS can detect a slot interval in which it will attempt initial ranging, by receiving the UL-MAP.

Referring to FIG. 6, a BS determines a value s(n) obtained by counting the number of MSs that have succeeded in initial ranging in an $n^{th}$ frame (current frame) in step 601. Herein, the MSs that succeeded in initial ranging refer to MSs that have received an 'RNG-RSP with success' message. The BS calculates a slot occupation ratio r(n) in the $n^{th}$ frame using the value s(n) and the number of initial ranging contention slots allocated to the $n^{th}$ frame, in step 603. The slot occupation ratio r(n) can be expressed as Equation (1):

$$r(n) = \frac{s(n)}{\text{slot}(n)} \quad (1)$$

where slot(n) denotes the number of initial ranging contention slots allocated to an $n^{th}$ frame (current frame).

Thereafter, the BS compares a slot occupation ratio r(n−1) in an $(n−1)^{th}$ frame (previous frame) with a slot occupation ratio r(n) in an $n^{th}$ frame (current frame) in step 605. If r(n−1)<r(n), the BS can predict that the number of initial ranging-attempting MSs has increased. On the contrary, if r(n−1)>r(n), the BS can predict that the number of initial ranging-attempting MSs has decreased. If r(n−1)<r(n), the BS proceeds to step 607, and if r(n−1)>r(n), the BS proceeds to step 609. If the $(n−1)^{th}$ frame is an initial frame, there is no $(n−2)^{th}$ frame. Therefore, in order to calculate slot(n−1) for the $(n−1)^{th}$ frame, the BS uses a value r(n−2) for the $(n−2)^{th}$ frame, predetermined in the system.

The BS increases an Event_I count by 1 in step 607. The Event_I count indicates the number of events in which the slot occupation ratio increased. That is, if r(n+1)<r(n), the Event_I count increases by 1.

On the contrary, the BS increases an Event_D count by 1 in step 609. The Event_D count indicates the number of events in which the slot occupation ratio decreased.

The BS calculates the number, slot(n+1), of initial ranging contention slots to be allocated to an (n+1)th frame (next frame) in step 611. That is, if r(n−1)<r(n) (step 607), the BS can determine slot(n+1) using Equation (2) below.

$$\text{slot}(n+1) = \text{slot}(n) + \text{ceil}(\text{pow}(r(n), \text{Event\_I})) \quad (2)$$

In Equation (2), ceil(X) indicates that the least integer greater than X is returned. For example, ceil(4.25)=5. In addition, pow(Y, Z) indicates that Y exponentially increases by a power of Z. For example, pow(10, 3)=$10^3$. That is, it can be noted from Equation (2) that if r(n−1)<r(n), the number, slot(n+1), of initial ranging contention slots to be allocated to the $(n+1)^{th}$ frame (next frame) increases with an exponential function of r(n).

In step 611, if r(n−1)>r(n) (step 609), the BS can determine slot(n+1) using Equation (3) below.

$$\text{slot}(n+1) = \text{slot}(n) − \text{ceil}(\text{pow}(r(n), \text{Event\_D})) \quad (3)$$

It can be noted from Equation (3) that if r(n−1)>r(n), the number, slot(n+1), of initial ranging contention slots to be allocated to the $(n+1)^{th}$ frame (next frame) decreases with an exponential function of r(n).

The slot(n+1) should be determined such that it should not exceed the maximum number of allocated initial ranging contention slots and the minimum number of allocated ranging contention slots. That is, if the value slot(n+1) is greater than the maximum number of allocated initial ranging contention slots, the value slot(n+1) should be determined as the maximum number of allocated initial ranging contention slots. In addition, if the value slot(n+1) is less than the minimum number of allocated initial ranging contention slots, the value slot(n+1) should be determined as the minimum number of allocated initial ranging contention slots.

Figure 7:
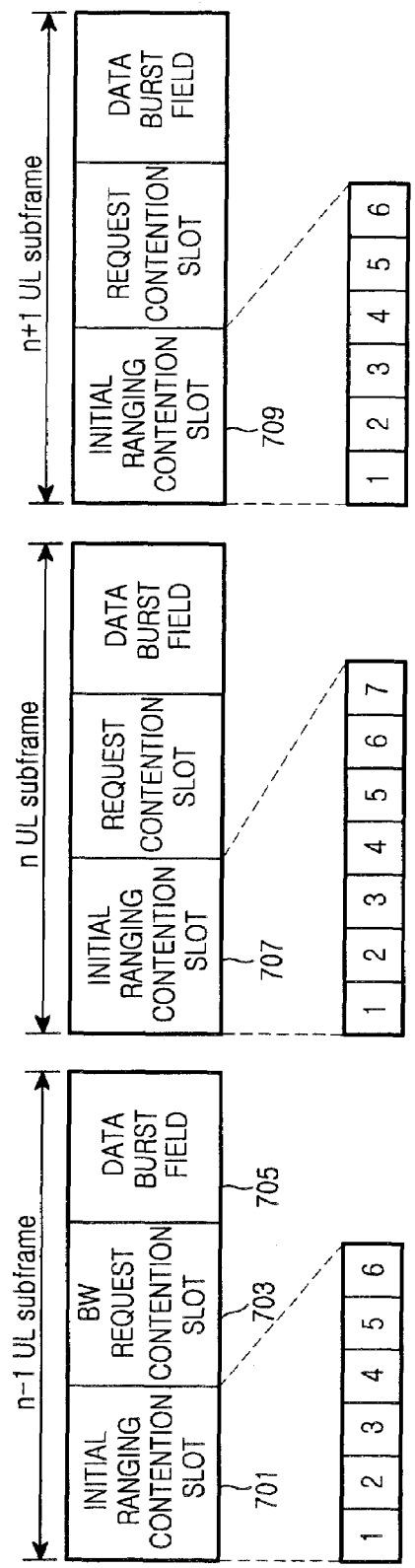
FIG. 7 is a diagram schematically illustrating a format of an uplink frame, which varies depending on the dynamically determined number of initial ranging contention slots, according to the first embodiment of the present invention.

FIG. 7 is a diagram schematically illustrating a format of an uplink frame, which varies depending on the dynamically determined number of initial ranging contention slots, according to the present invention.

Figure 1:
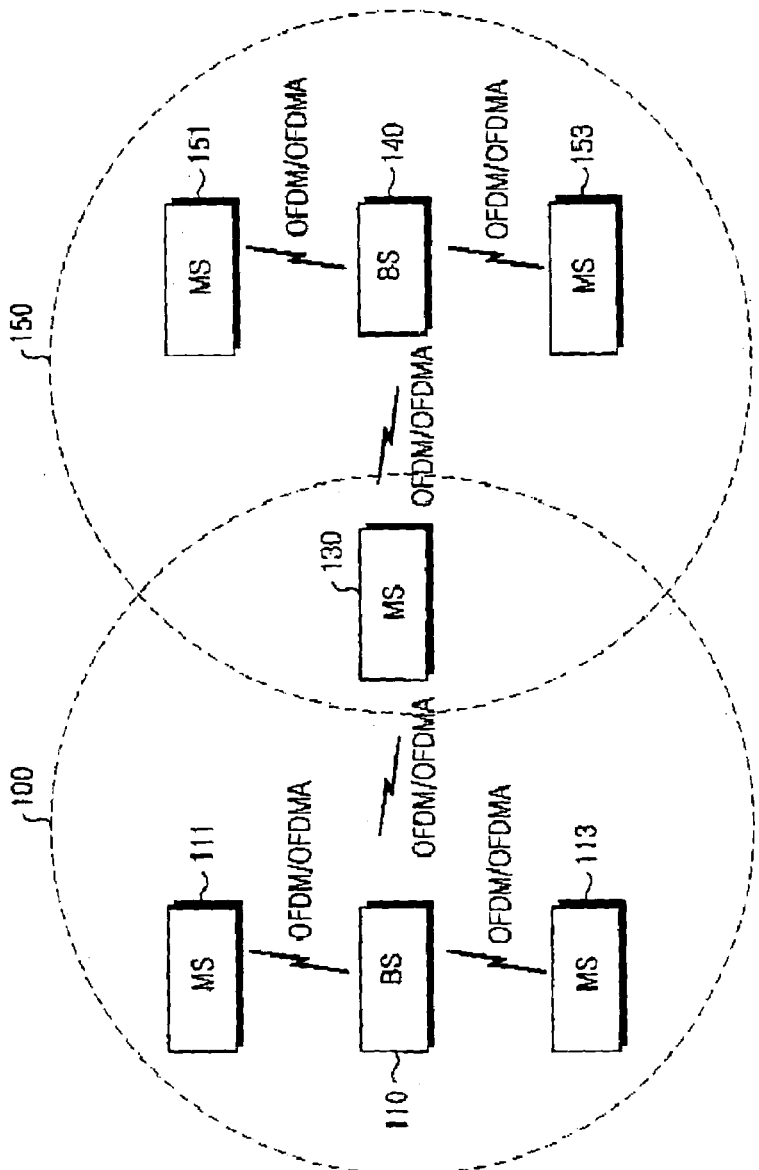
FIG. 1 is a diagram schematically illustrating a configuration of a conventional IEEE 802.16 communication system.
Figure 2:
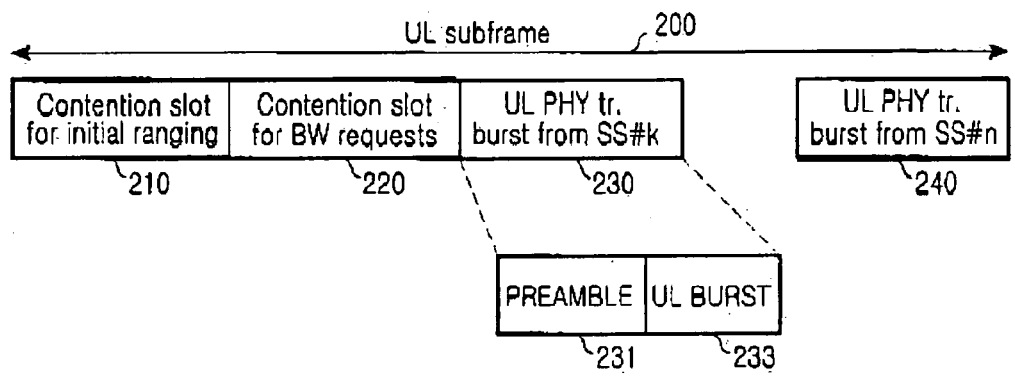
FIG. 2 is a diagram schematically illustrating a format of an uplink frame in an OFDM/OFDMA BWA communication system.
Figure 3:
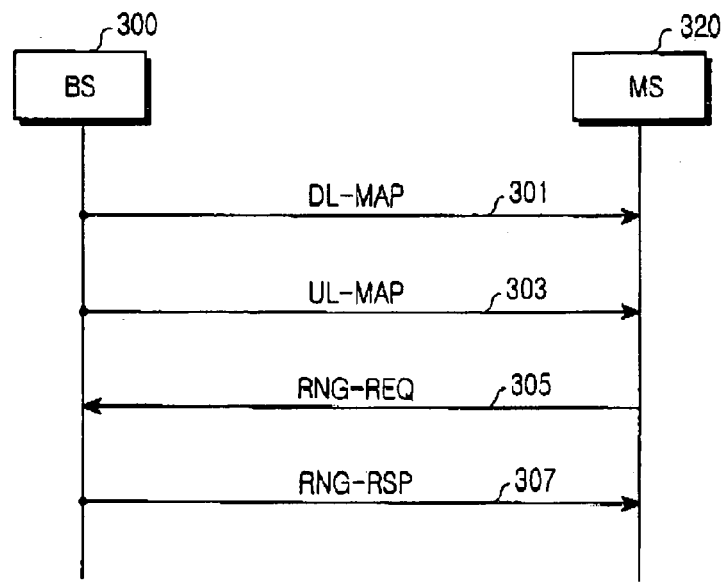
FIG. 3 is a signaling diagram schematically illustrating a communication process in a BWA communication system.
Figure 4:
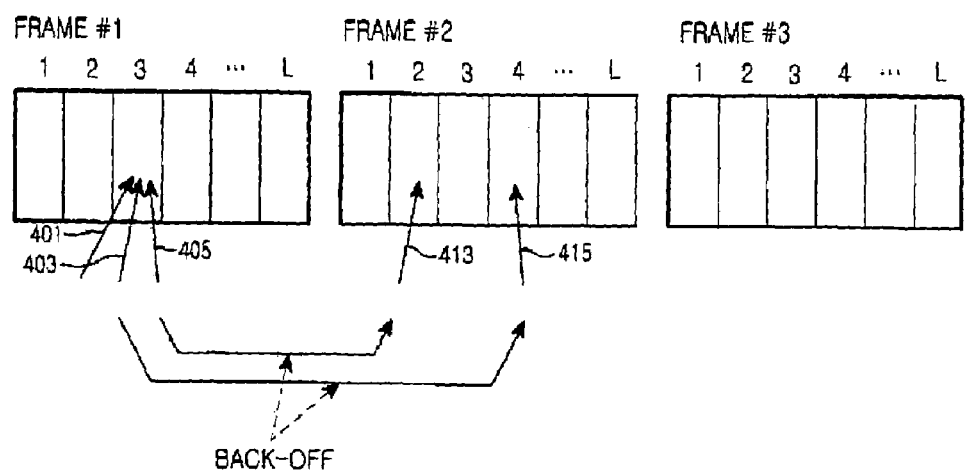
FIG. 4 is a diagram schematically illustrating a back-off process at the collision of ranging slots in a conventional BWA communication system.

Referring to FIG. 7, each OFDMA uplink frame forms a control symbol region with an initial ranging contention slot and a bandwidth request contention slot, and forms a data burst region with data bursts for individual MSs. By way of example, the uplink frames are illustrated, each of which can form a control symbol region with an initial ranging contention slot, a bandwidth request contention slot and a periodic ranging slot, or can form the control symbol region only with a particular ranging slot. The data burst region, like the slots 230 and 240 shown in FIG. 2, is formed with a plurality of burst regions so that uplink data can be transmitted for each individual MS, and each of the burst regions includes a preamble 231 and an uplink burst 233.

As described above, in an $(n−1)^{th}$ frame, the number of initial ranging contention slots 701 is determined according to the number, slot(n−2), of MSs that succeeded in initial ranging in an $(n−2)^{th}$ frame (previous frame), and a value slot(n−1) determined by a slot occupation ratio r(n−2) and a value Event_I or Event_D. That is, the number of initial ranging contention slots of the $(n−1)^{th}$ frame is determined by Equation (4):

$$\text{slot}(n−1) = \text{slot}(n−2) \pm \text{ceil}(\text{pow}(r(n−2), \text{Event\_I or Event\_D})) \quad (4)$$

It can be noted in FIG. 7 that the number of initial ranging contention slots of an $(n−1)^{th}$ frame is determined as 6 in accordance with Equation (4).

Assuming that the number of MSs that succeeded in initial ranging in the $(n−1)^{th}$ frame has increased, a slot occupation ratio r(n−1) of the $(n−1)^{th}$ frame is greater than a slot occupation ratio r(n−2) of an $(n−2)^{th}$ frame, increasing a value Event_I by 1. Therefore, the number of initial ranging contention slots in the $n^{th}$ frame is determined by Equation (5):

$$\text{slot}(n) = \text{slot}(n−1) + \text{ceil}(\text{pow}(r(n−1), \text{Event\_I})) \quad (5)$$

In Equation (5), a value slot(n−1) is 6 and a value ceil(pow(r(n−1), Event_I)) is 1, so a value slot(n) is determined as 7.

It can be noted that the number of initial ranging contention slots in the $n^{th}$ frame (current frame) is greater than the number of initial ranging contention slots in the $(n−1)^{th}$ frame (previous frame). In this case, the increase in the number of slots causes a reduction in the number of slots in the data burst region or the number of bandwidth request contention slots.

Assuming that the number of MSs that succeeded in initial ranging in the $n^{th}$ frame has decreased, a slot occupation ratio r(n) of the $n^{th}$ frame is less than a slot occupation ratio r(n−1) of the $(n−1)^{th}$ frame, increasing a value Event_D by 1. Therefore, the number of initial ranging contention slots in the $(n+1)^{th}$ frame is determined by Equation (6):

$$\text{slot}(n+1) = \text{slot}(n) − \text{ceil}(\text{pow}(r(n), \text{Event\_D})) \quad (6)$$

In Equation (6), a value slot(n) is 7 and a value ceil(pow(r(n), Event_D)) is 1, so a value slot(n+1) is determined as 6.

It can be noted that the number of initial ranging contention slots in the $(n+1)^{th}$ frame is less than the number of initial ranging contention slots in the $n^{th}$ frame (previous frame). In this case, the decrease in the number of slots causes an increase in the number of slots in the data burst field or the number of bandwidth request contention slots.

Information on the determined number of initial ranging contention slots for each individual frame is broadcasted to MSs through a UL-MAP.

Figure 8:
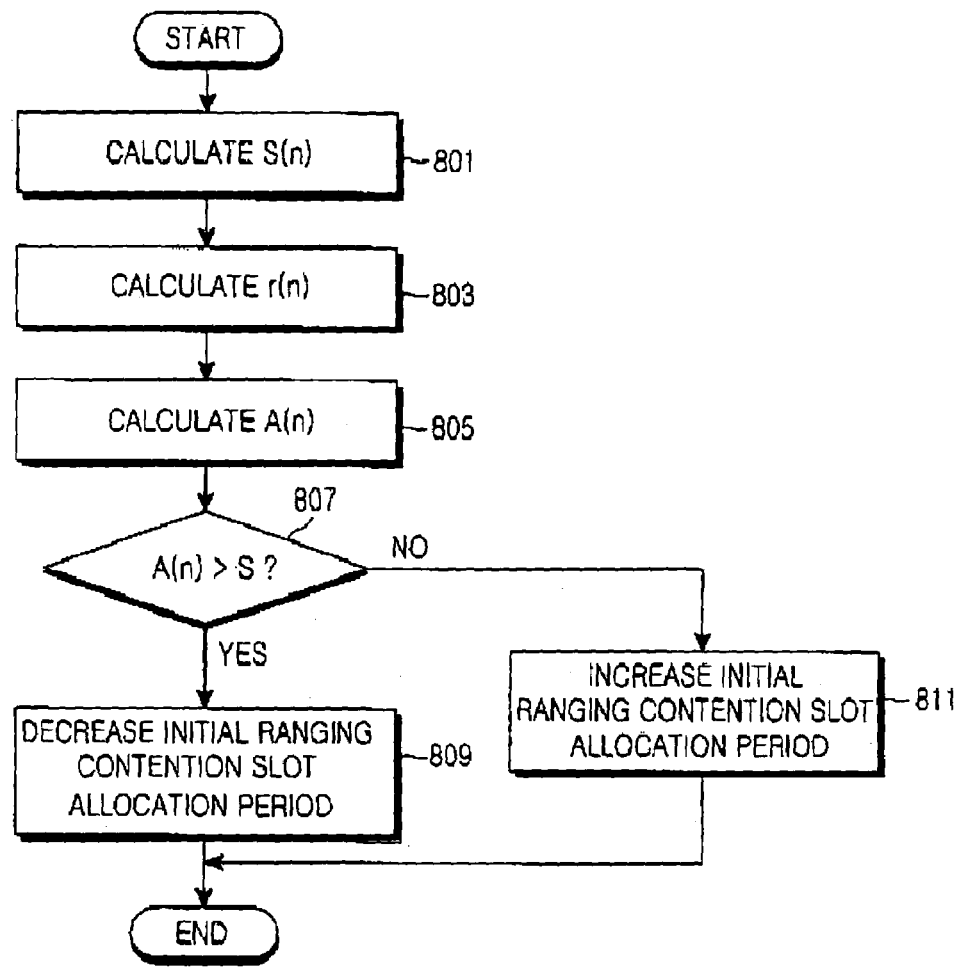
FIG. 8 is a flowchart illustrating a process of dynamically determining a frame allocation period for an initial ranging field by calculating an average initial ranging slot occupation ratio by a BS according to a second embodiment of the present invention.

FIG. 8 is a flowchart illustrating a process of dynamically determining a frame allocation period for an initial ranging field by calculating an average initial ranging slot occupation ratio by a BS according to a second embodiment of the present invention.

Before a description of FIG. 8 is given, it should be noted that a decrease in number of MSs managed by a BS reduces probability that the MSs will request ranging, and an increase in number of MSs managed by the BS increases probability that the MSs will request ranging. Therefore, in order to efficiently allocate radio resources, a BS according to a second embodiment of the present invention can determine a frame period for allocation of ranging resources by calculating an average slot occupation ratio up to the present.

More specifically, the BS reduces a ranging contention slot allocation period if an average slot occupation ratio is higher than a threshold. Herein, an increase in the number of ranging requests made by the MSs indicates an increase in the average slot occupation ratio. For example, when the BS reallocates a ranging resource in an $(n+2)^{th}$ frame after allocating a ranging resource in an $n^{th}$ frame, the ranging contention slot allocation period becomes 2. That is, there is no ranging resource allocated in an $(n+1)^{th}$ frame, contributing to an increase in the data burst field and data transmission efficiency.

Referring to FIG. 8, a BS determines a value s(n) by counting the number of MSs that succeeded in initial ranging in an $n^{th}$ frame in step 801. The BS determines, in step 803, a slot occupation ratio r(n) using the number of initial ranging contention slots allocated in the $n^{th}$ frame and the determined value s(n). The BS determines an average slot occupation ratio A(n) in the $n^{th}$ frame in step 805. The average slot occupation ratio A(n) is determined by Equation (7):

$$A(n) = \beta \cdot r(n) + (1-\beta) \cdot A(n-1) \quad (7)$$

The value A(n) is determined depending on an average slot occupation ratio up to the previous frame and a slot occupation ratio of the current frame. In Equation (7), β denotes a weight and has a real value ranging from 0 to 1. The weight β is variable depending on whether it will be applied to the current frame or the previous frame in system implementation.

The BS determines in step 807 whether the value A(n) is greater than a threshold S. If the value A(n) is greater than the threshold S, the BS proceeds to step 809. Otherwise, the BS proceeds to step 811. In step 809, the BS decreases an initial ranging contention slot allocation period, determining that the number of initial ranging-requesting MSs has increased. That is, if a previous initial ranging contention slot allocation period is 4, the BS decreases the initial ranging contention slot allocation period to 3 by one. As a result, after allocating an initial ranging resource in the $n^{th}$ frame, the BS reallocates an initial ranging resource in an $(n+3)^{th}$ frame. In this case, there are no initial ranging resources allocated to $(n+1)^{th}$ and $(n+2)^{th}$ frames.

In step 811, the BS increases the initial ranging contention slot allocation period, determining that the number of initial ranging-requesting MSs has decreased. That is, if a previous initial ranging contention slot allocation period is 4, the BS increases the initial ranging contention slot allocation period to 5 by one. As a result, after allocating an initial ranging resource in the $n^{th}$ frame, the BS reallocates an initial ranging resource in an $(n+5)^{th}$ frame. In this case, there are no initial ranging resources allocated to $(n+1)^{th}$, $(n+2)^{th}$, $(n+3)^{th}$ and $(n+4)^{th}$ frames. The initial ranging contention slot allocation period is variable depending on the system implementation.

As can be understood from the foregoing description, in the BWA communication system according to the present invention, the BS can dynamically change the number of ranging contention slots and the ranging contention slot allocation period according to a slot occupation ratio and an average slot occupation ratio, contributing to an increase in ranging success rate of MSs and radio resource efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a number of ranging slots by a base station (BS) in a broadband wireless access (BWA) communication system, the method comprising the steps of:
   counting a number of mobile stations (MSs) that succeeded in ranging in a current frame;
   determining a ranging slot occupation ratio in the current frame;
   comparing a ranging slot occupation ratio of a previous frame with the ranging slot occupation ratio of the current frame;
   detecting an increase in a number of ranging-requesting MSs, if the ranging slot occupation ratio of the current frame is greater than the ranging slot occupation ratio of the previous frame; and
   determining the number of ranging slots of a next frame such that the number of ranging slots of the next frame is greater than the number of ranging slots of the current frame.

2. The method of claim 1, wherein the ranging slot occupation ratio in the current frame is defined as a ratio of the number of MSs that succeeded in ranging in the current frame to the number of ranging slots allocated to the current frame.

3. The method of claim 1, wherein ranging is one of initial ranging, bandwidth request ranging and periodic ranging.

4. The method of claim 1, wherein if the ranging slot occupation ratio of the current frame is greater than the ranging slot occupation ratio of the previous frame, the number of ranging slots of the next frame is determined by defining a first variable determined according to the increase in the number of ranging-requesting MSs, exponentially increasing the slot occupation ratio of the current frame using the first variable and adding a minimum integer greater than a value of the increased slot occupation ratio to the number of ranging slots of the current frame.

5. The method of claim 1, further comprising:
   if the ranging slot occupation ratio of the current frame is less than the ranging slot occupation ratio of the previous frame, detecting a decrease in the number of ranging-requesting MSs; and
   determining the number of ranging slots of the next frame such that the number of ranging slots of the next frame is less than the number of ranging slots of the current frame.

6. The method of claim 5, wherein if the ranging slot occupation ratio of the current frame is less than the ranging slot occupation ratio of the previous frame, the number of ranging slots of the next frame is determined by defining a second variable determined according to the decrease in the number of ranging-requesting MSs, exponentially increasing the slot occupation ratio of the current frame using the second variable, and subtracting a minimum integer greater than a value of the increased slot occupation ratio from the number of ranging slots of the current frame.

7. A method for determining a ranging slot allocation period by a base station (BS) in a broadband wireless access (BWA) communication system, the method comprising the steps of:
   counting a number of mobile stations (MSs) that succeeded in ranging in a current frame;
   determining a ranging slot occupation ratio of the current frame;

determining an average slot occupation ratio up to the current frame depending on an average slot occupation ratio up to a previous frame and the slot occupation ratio of the current frame;

comparing the average slot occupation ratio up to the current frame with a threshold; and decreasing a ranging slot allocation period if the average slot occupation ratio up to the current frame is greater than the threshold.

8. The method of claim 7, wherein the ranging slot occupation ratio in the current frame is defined as a ratio of the number of MSs that succeeded in ranging in the current frame to the number of ranging slots allocated to the current frame.

9. The method of claim 7, wherein ranging is one of initial ranging, bandwidth request ranging and periodic ranging.

10. The method of claim 7, further comprising increasing the ranging slot allocation period if the average slot occupation ratio up to the current frame is less than the threshold.

11. The method of claim 7, wherein the ranging slot allocation period is defined in frames.

12. The method of claim 7, wherein the average slot occupation ratio up to the current frame is determined by $$A(n)=\beta \cdot r(n)+(1-\beta) \cdot A(n-1)$$

where $\beta$ denotes a weight having a real value ranging from 0 to 1, $r(n)$ denotes a slot occupation ratio in an $n^{th}$ frame, and $A(n-1)$ denotes an average slot occupation ratio up to an $(n-1)^{th}$ frame.

13. A system for performing ranging according to a number of ranging slots in a broadband wireless access (BWA) communication system including a base station (BS) and a mobile station (MS), the system comprising:

the BS for counting a number of MSs that succeeded in ranging in a current frame, determining a ranging slot occupation ratio in the current frame, comparing a ranging slot occupation ratio of a previous frame with the ranging slot occupation ratio of the current frame, detecting an increase in a number of ranging-requesting MSs if the ranging slot occupation ratio of the current frame is greater than the ranging slot occupation ratio of the previous frame, and determining a number of ranging slots of a next frame such that the number of ranging slots of the next frame is greater than the number of ranging slots of the current frame; and the MS for receiving an uplink MAP (UL-MAP) of the current frame being broadcasted from the BS, analyzing ranging information including the number of ranging slots of the next frame and performing ranging depending on the analyzed ranging information.

14. The system of claim 13, wherein the BS defines the ranging slot occupation ratio in the current frame as a ratio of the number of MSs that succeeded in ranging in the current frame to the number of ranging slots allocated to the current frame.

15. The system of claim 13, wherein ranging is one of initial ranging, bandwidth request ranging and periodic ranging.

16. The system of claim 13, wherein if the ranging slot occupation ratio of the current frame is greater than the ranging slot occupation ratio of the previous frame, the BS determines the number of ranging slots of the next frame by defining a first variable determined according to the increase in the number of ranging-requesting MSs, exponentially increasing the slot occupation ratio of the current frame using the first variable, and adding a minimum integer greater than a value of the increased slot occupation ratio to the number of ranging slots of the current frame.

17. The system of claim 13, wherein if the ranging slot occupation ratio of the current frame is less than the ranging slot occupation ratio of the previous frame, the BS determines the number of ranging slots of the next frame such that the number of ranging slots of the next frame is less than the number of ranging slots of the current frame, determining that the number of ranging-requesting MSs has decreased.

18. The system of claim 17, wherein if the ranging slot occupation ratio of the current frame is less than the ranging slot occupation ratio of the previous frame, the BS determines the number of ranging slots of the next frame by defining a second variable determined according to the decrease in the number of ranging-requesting MSs, exponentially increasing the slot occupation ratio of the current frame using the second variable, and subtracting a minimum integer greater than a value of the increased slot occupation ratio from the number of ranging slots of the current frame.

19. The system of claim 13, wherein the BS determines the number of ranging slots for every individual frame.

20. A system for performing ranging according to a ranging slot allocation period in a broadband wireless access (BWA) communication system including a base station (BS) and a mobile station (MS), the system comprising:

the BS for counting a number of MSs that succeeded in ranging in a current frame, determining a ranging slot occupation ratio in the current frame, determining an average slot occupation ratio up to the current frame depending on an average slot occupation ratio up to a previous frame and the slot occupation ratio of the current frame, comparing the average slot occupation ratio up to the current frame with a threshold, and decreasing a ranging slot allocation period if the average slot occupation ratio up to the current frame is greater than the threshold; and the MS for receiving an uplink MAP (UL-MAP) of the current frame being broadcasted from the BS, analyzing ranging information including the ranging slot allocation period, and performing ranging depending on the analyzed ranging information.

21. The system of claim 20, wherein the BS defines the ranging slot occupation ratio in the current frame as a ratio of the number of MSs that succeeded in ranging in the current frame to the number of ranging slots allocated to the current frame.

22. The system of claim 20, wherein ranging is one of initial ranging, bandwidth request ranging and periodic ranging.

23. The system of claim 20, wherein the BS increases the ranging slot allocation period if the average slot occupation ratio up to the current frame is less than the threshold.

24. The system of claim 20, wherein the BS determines the ranging slot allocation period in frames.

25. The system of claim 20, wherein the BS determines the average slot occupation ratio up to the current frame using the following equation, $$A(n)=\beta \cdot r(n)+(1-\beta) \cdot A(n-1)$$

where $\beta$ denotes a weight having a real value ranging from 0 to 1, $r(n)$ denotes a slot occupation ratio in an $n^{th}$ frame, and $A(n-1)$ denotes an average slot occupation ratio up to an $(n-1)^{th}$ frame.

* * * * *

UNITED STATES PATENT AND TRADEMARK OFFICE
CERTIFICATE OF CORRECTION

PATENT NO. : 7,587,212 B2  Page 1 of 1
APPLICATION NO. : 11/328383
DATED : September 8, 2009
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Twenty-first Day of September, 2010

David J. Kappos
*Director of the United States Patent and Trademark Office*